US012803114B2

(12) United States Patent
Tang et al.

(10) Patent No.: US 12,803,114 B2
(45) Date of Patent: Nov. 17, 2026

(54) SEPARATOR AND RELATED SECONDARY BATTERY, BATTERY MODULE, BATTERY PACK AND POWER CONSUMPTION APPARATUS

(71) Applicant: CONTEMPORARY AMPEREX TECHNOLOGY (HONG KONG) LIMITED, Hong Kong (CN)

(72) Inventors: Huaichao Tang, Ningde (CN); Ting Li, Ningde (CN); Shaojun Niu, Ningde (CN); Minggao Ouyang, Ningde (CN); Kai Wu, Ningde (CN)

(73) Assignee: CONTEMPORARY AMPEREX TECHNOLOGY (HONG KONG) LIMITED, Hong Kong (CN)

( * ) Notice: Subject to any disclaimer, the term of this patent is extended or adjusted under 35 U.S.C. 154(b) by 631 days.

(21) Appl. No.: 18/207,162

(22) Filed: Jun. 8, 2023

(65) Prior Publication Data

US 2023/0318140 A1 Oct. 5, 2023

Related U.S. Application Data

(63) Continuation of application No. PCT/CN2022/072330, filed on Jan. 17, 2022.

(51) Int. Cl.

*H01M 50/446* (2021.01)
*H01M 50/417* (2021.01)
(Continued)

(52) U.S. Cl.

CPC ....... *H01M 50/446* (2021.01); *H01M 50/417* (2021.01); *H01M 50/46* (2021.01); *H01M 50/538* (2021.01)

(58) Field of Classification Search

CPC .. H01M 50/446; H01M 50/417; H01M 50/42; H01M 50/46; H01M 50/449; H01M 50/538; H01M 10/0525; Y02E 60/10

See application file for complete search history.

(56) References Cited

U.S. PATENT DOCUMENTS 5,989,743 A * 11/1999 Yamashita .......... H01M 50/572 429/170
2015/0010797 A1 1/2015 Kim
(Continued)

FOREIGN PATENT DOCUMENTS

CN 101150185 A 3/2008
CN 110800126 A 2/2020
(Continued)

OTHER PUBLICATIONS

International Search Report mailed on Oct. 13, 2022, in corresponding PCT/CN2022/072330, 6 pages.
(Continued)

*Primary Examiner* — Aiqun Li
(74) *Attorney, Agent, or Firm* — XSENSUS LLP

(57) ABSTRACT

The present application relates to a separator, including a porous substrate, and a coating on at least one surface of the porous substrate. The coating may include a first region and a second region, the first region including an inorganic ceramic particle and a first polymer, the second region including a second polymer, and the first region having a same thickness as the second region, where a weight content of the second polymer in the second region may be 20%-100%, based on a total weight of the second region.

9 Claims, 3 Drawing Sheets

(51) Int. Cl.
*H01M 50/46* (2021.01)
*H01M 50/538* (2021.01)

(56) References Cited

U.S. PATENT DOCUMENTS

| | | | | |
|---|---|---|---|---|
| 2015/0056491 | A1* | 2/2015 | Zhao .................... | H01M 50/451 429/144 |
| 2015/0372277 | A1* | 12/2015 | Honda ................ | H01M 50/443 429/145 |
| 2020/0168872 | A1 | 5/2020 | Fu et al. | |
| 2020/0266415 | A1 | 8/2020 | Lee et al. | |
| 2021/0320378 | A1 | 10/2021 | Lee et al. | |
| 2022/0059909 | A1* | 2/2022 | Lee ..................... | H04M 1/0262 |

FOREIGN PATENT DOCUMENTS

| | | | |
|---|---|---|---|
| CN | 111211279 | A | 5/2020 |
| CN | 111954943 | A | 11/2020 |
| CN | 113823877 | A | 12/2021 |
| JP | 2004-311138 | A | 11/2004 |
| JP | 2005-093375 | A | 4/2005 |
| KR | 2012-0108686 | A | 10/2012 |
| WO | 2021/189454 | A1 | 9/2021 |

OTHER PUBLICATIONS

Extended European Search Report issued Nov. 12, 2024 in European Patent Application No. 22896837.6.
First Office Action mailed on Aug. 11, 2026, received for CN Application 202280005859.4, 14 pages including English Translation.

* cited by examiner

SEPARATOR AND RELATED SECONDARY BATTERY, BATTERY MODULE, BATTERY PACK AND POWER CONSUMPTION APPARATUS

CROSS-REFERENCE TO RELATED APPLICATION

The present application is a continuation of International Application No. PCT/CN2022/072330, filed Jan. 17, 2022, which is incorporated herein by reference in its entirety.

TECHNICAL FIELD

The present application relates to the field of secondary battery technologies, and in particular, to a separator and a related secondary battery, a battery module, a battery pack and a power consumption apparatus.

BACKGROUND

In recent years, with the wider application of secondary batteries, the secondary batteries are widely applied to energy storage power systems, such as hydropower, firepower, wind power and solar power plants, as well as many fields such as electrical tools, electric bicycles, electric motorcycles, electric vehicles, military equipment and aerospace. Due to the great development of the secondary batteries, higher requirements are put forward for their energy density, cycle performance, safety performance, and the like.

SUMMARY

The present application is made in view of the above subject, and a purpose thereof is to provide a separator so that a secondary battery prepared by the separator has improved safety performance and cycle performance.

In order to achieve the above purpose, the present application provides a separator, a secondary battery, a battery module, a battery pack and a power consumption apparatus including the separator.

A first aspect of the present application provides a separator, including

- a porous substrate, and
- a coating on at least one surface of the porous substrate, the coating including a first region and a second region, the first region including an inorganic ceramic particle and a first polymer, the second region including a second polymer, and the first region having a same thickness as the second region, where a weight content of the second polymer in the second region is 20%-100%, optionally 50%-100%, based on a total weight of the second region.

The coating of the separator of the present application includes the first region and the second region, when a secondary battery is assembled, the second region is provided at a corner of an innermost circle of a winding-typed electrode assembly. In an electrolytic solution, the second region forms a protrusion relative to the first region, and the protrusion may make a positive electrode sheet and a negative electrode sheet here in close contact, so as to promote a normal transmission of a lithium ion in the process of charging and discharging, and thereby improving cycle performance and safety performance of the secondary battery.

In any embodiment, the second polymer is selected from at least one of polyvinylidene fluoride, polyvinyl alcohol, polypropylene alcohol, chlorinated rubber, ethylene-vinyl acetate copolymer, polyvinyl acetate, polyvinyl butyrate, polyvinyl chloride, polybutadiene, cyclized rubber, acrylonitrile-methyl acrylate copolymer and sodium carboxymethyl cellulose.

In any embodiment, a weight content of the inorganic ceramic particle in the first region is 50%-99%, based on a total weight of the first region. When the weight content of the inorganic ceramic particle in the first region is within a given range, cycle performance and safety performance of the secondary battery may be further improved.

A second aspect of the present application provides a secondary battery, including a winding-typed electrode assembly, the winding-typed electrode assembly includes the separator according to the first aspect of the present application, and the second region is provided at a corner of an innermost circle of the winding-typed electrode assembly.

A third aspect of the present application provides a battery module, including the secondary battery according to the second aspect of the present application.

A fourth aspect of the present application provides a battery pack, including the battery module according to the third aspect of the present application.

A fifth aspect of the present application provides a power consumption apparatus, including at least one selected from the secondary battery according to the second aspect of the present application, the battery module according to the third aspect of the present application or the battery pack according to the fourth aspect of the present application.

The battery module, the battery pack and the power consumption apparatus in the present application include the secondary battery according to the present application, and therefore have at least the same advantages as the secondary battery.

DESCRIPTION OF REFERENCE SIGNS

Figure 1:
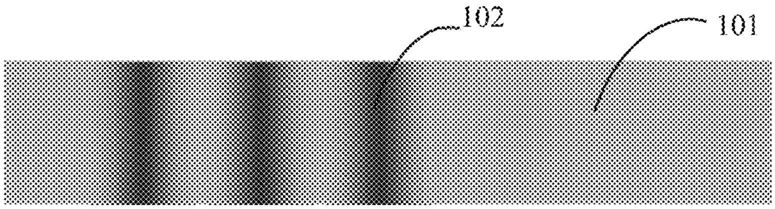
FIG. 1 is a schematic diagram of a separator according to an embodiment of the present application.

1 battery pack; 2 upper box; 3 lower box; 4 battery module; 5 secondary battery; 51 housing; 52 electrode assembly; 53 top cover assembly; 10 separator; 100 porous substrate; 101 first region; 102 second region; 001 negative electrode; 002 positive electrode; 200 corner.

DESCRIPTION OF EMBODIMENTS

Hereinafter, embodiments that specifically disclose a separator, a secondary battery, a battery module, a battery pack and a power consumption apparatus of the present application will be described in detail with reference to the accompanying drawings as appropriate. However, unnecessarily detailed descriptions may be omitted in some cases. For example, detailed descriptions of well-known matters and repeated descriptions of practically identical structures are omitted. This is done to avoid unnecessarily redundant descriptions for ease of understanding by persons skilled in the art. In addition, the drawings and the following description are provided for a full understanding of the present application by persons skilled in the art, and are not intended to limit the subject matter in the claims.

A "range" disclosed herein is defined in the form of a lower limit and an upper limit. A given range is defined by selecting a lower limit and an upper limit, and the selected lower limit and upper limit define a boundary of a particular range. The range defined in this manner may or may not include end values, and may be combined arbitrarily, that is, any lower limit may be combined with any upper limit to form a range. For example, if ranges of 60-120 and 80-110 are listed for a particular parameter, it is understood that ranges of 60-110 and 80-120 are further contemplated. In addition, if the minimum range values listed are 1 and 2, and the maximum range values listed are 3, 4 and 5, all the following ranges are contemplated: 1-3, 1-4, 1-5, 2-3, 2-4, and 2-5. In the present application, unless otherwise specified, a numerical range "a-b" represents an abbreviated representation of any combination of real numbers between a and b, where both a and b are real numbers. For example, a numerical range "0-5" means that all real numbers between "0-5" have been listed herein, and "0-5" is just an abbreviated representation of a combination of these numerical values. In addition, when a certain parameter is expressed as an integer≥2, it is equivalent to disclosing that the parameter is, for example, an integer of 2, 3, 4, 5, 6, 7, 8, 9, 10, 11, 12, or the like.

Unless otherwise specified, all embodiments and optional embodiments of the present application may be combined with each other to form a new technical solution.

Unless otherwise specified, all technical features and optional technical features of the present application may be combined with each other to form a new technical solution.

Unless otherwise specified, all steps of the present application may be performed sequentially or randomly, but preferably, performed sequentially. For example, a method includes steps (a) and (b), which means that the method may include steps (a) and (b) performed sequentially, or steps (b) and (a) performed sequentially. For example, the method mentioned may further include step (c), which means that step (c) may be added to the method in any order, for example, the method may include steps (a), (b) and (c), steps (a), (c) and (b), steps (c), (a) and (b), or the like.

Unless otherwise specified, "comprising" and "including" mentioned in the present application are open-ended or closed-ended. For example, the "comprising" and "including" may mean that other components that are not listed may further be comprised or included, or only listed components may be comprised or included.

In the present application, unless otherwise specified, the term "or" is inclusive. For example, the phrase "A or B" means "A, B or both A and B". More particularly, a condition "A or B" is satisfied by any one of the following: A is true (or present) and B is false (or not present); A is false (or not present) and B is true (or present); or both A and B are true (or present).

A secondary battery with a winding-typed electrode assembly is widely used for its rapid and high production efficiency. However, in the winding-typed electrode assembly, especially at a corner of an innermost circle of the winding-typed electrode assembly, too large distance between a positive electrode sheet and a negative electrode sheet affects a transmission of a lithium ion during the process of charging and discharging, and it is manifested as problems such as a battery capacity decay.

After a lot of experiments, the inventor of the present application found that when a coating of a separator includes a first region and a second region, in an electrolytic solution, the second region forms a protrusion at the corner of the innermost circle of the winding-typed electrode assembly, which makes a positive electrode sheet and a negative electrode sheet in close contact, so as to promote a normal transmission of a lithium ion in the process of charging and discharging, and thereby improving cycle performance and safety performance of the secondary battery.

[Separator]

In an embodiment of the present application, the present application provides a separator, including a porous substrate, and a coating on at least one surface of the porous substrate, the coating including a first region and a second region, the first region including an inorganic ceramic particle and a first polymer, the second region including a second polymer, and the first region having a same thickness as the second region, where a weight content of the second polymer in the second region is 20%-100%, optionally 50%-100%, based on a total weight of the second region.

Although a mechanism is still unclear, the inventor of the present application speculates that the reasons are as follows: the coating of the separator of the present application includes the first region and the second region, the first region includes the inorganic ceramic particle and the first polymer, the second region includes the second polymer, and the weight content of the second polymer in the second region is 20%-100%, optionally 50%-100%. When a secondary battery is assembled, in an electrolytic solution, a swelling thickness of the second region is greater than a swelling thickness of the first region, that is, the second region forms a protrusion relative to the first region. When the second region is provided at a corner of an innermost circle of a winding-typed electrode assembly, the protrusion may make a positive electrode sheet and a negative electrode sheet here in close contact, so as to promote a normal transmission of a lithium ion in the process of charging and discharging, and thereby improving cycle performance and safety performance of the secondary battery.

In addition, before being assembled into the secondary battery, the first region has a same thickness as the second region, which may ensure production efficiency and assembly efficiency.

Figure 2:
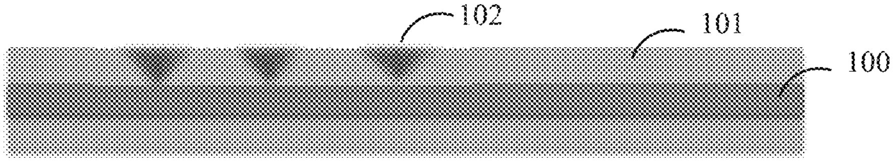
FIG. 2 is a front view of the separator according to an embodiment of the present application shown in FIG. 1.

As shown in FIGS. 1 and 2, the separator includes a porous substrate 100 and a coating, the coating includes a first region 101 and a second region 102, the first region 101 and the second region 102 have a same thickness.

Figure 3:
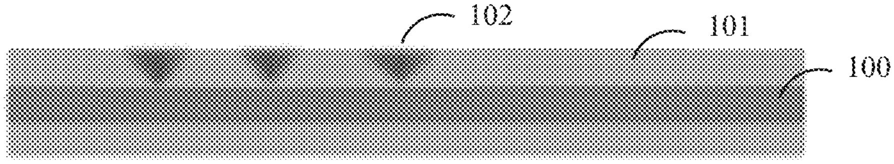
FIG. 3 is a front view of the separator after swelling according to an embodiment of the present application shown in FIG. 1.

As shown in FIG. 3, after swelling in an electrolytic solution, a swelling thickness of the second region 102 is greater than a swelling thickness of the first region 101, that is, the second region 102 forms a protrusion relative to the first region 101.

In some embodiments, a weight content of the second polymer in the second region is 50%-99%, based on a total weight of the second region.

In some embodiments, the second polymer is selected from at least one of polyvinylidene fluoride, polyvinyl alcohol, polypropylene alcohol, chlorinated rubber, ethylene-vinyl acetate copolymer, polyvinyl acetate, polyvinyl butyrate, polyvinyl chloride, polybutadiene, cyclized rubber, acrylonitrile-methyl acrylate copolymer and sodium carboxymethyl cellulose.

In some embodiments, the second polymer is the same as the first polymer.

In some embodiments, the second polymer is different from the first polymer.

In some embodiments, the second region further includes the first polymer.

In some embodiments, the second polymer is a particle.

In the present application, a particle size range of the second polymer is 1 μm-20 μm, optionally 0.1 μm-10 μm, further optionally 1 μm-10 μm, and a test may be carried out by using devices and methods known in the art, for example, using an electronic scanning microscope for a direct observation.

In some embodiments, a weight content of the inorganic ceramic particle in the first region is 50%-99%, based on a total weight of the first region. When the weight content of the inorganic ceramic particle in the first region is within a given range, a good heat resistance of the separator may be ensured, and thereby further improving cycle performance and safety performance of a secondary battery.

In some embodiments, a weight content of the first polymer in the first region is 1%-50%, based on the total weight of the first region. When the weight content of the first polymer in the first region is within a given range, an interface stability between a separator and an electrode sheet may be improved, and thereby further improving cycle performance and safety performance of the secondary battery.

In some embodiments, the inorganic ceramic particle is selected from at least one of boehmite, alumina, silicon oxide, magnesium hydroxide, titanium dioxide, zirconia, tin dioxide, magnesium oxide and zinc oxide.

In some embodiments, a particle size distribution of the inorganic ceramic particle is 0.05 μm-5 μm. When the particle size distribution of the inorganic ceramic particle is within a given range, it may be ensured that a volumetric energy density of the secondary battery may be further improved on the premise that the secondary battery has batter cycle performance and safety performance.

According to some embodiments, the particle size distribution of the inorganic ceramic particle is a well-known meaning in the art, and may be measured by using instruments and methods known in the art. For example, it may be measured with a laser particle size analyzer (such as Master Size 3000) with reference to GB/T 19077-2016 particle size distribution laser diffraction method.

In some embodiments, the first polymer is selected from at least one of polyvinylidene fluoride, guar gum, sodium alginate, carboxymethyl cellulose, gum arabic, xanthan gum, gelatin, starch, cyclodextrin, chitosan and carrageenan.

In some embodiments, a width of the second region is 100 μm-10 mm.

In some embodiments, the coating includes three second regions.

According to some embodiments, the coating may further include other organic compounds, such as polymer, dispersant, wetting agent, etc. which may improve heat resistance. The present application has no special restriction on the types of other organic compounds mentioned above, and any well-known material with good performance improvement may be selected.

In some embodiments, the present application has no special restriction on the types of the porous substrate, and any well-known porous substrate with a good chemical stability and a mechanical stability may be selected.

In some embodiments, the porous substrate is selected from at least one of polyethylene and polypropylene.

In some embodiments, a thickness of the porous substrate is 5 μm-20 μm; and for example, the thickness of the porous substrate may be 5 μm-10 μm. When the thickness of the porous substrate is controlled within a given range, an energy density of the secondary battery may be further improved on the premise of ensuring magnification performance and safety performance of the secondary battery

[Secondary Battery]

In an embodiment of the present application, a secondary battery is provided, including a winding-typed electrode assembly, the winding-typed electrode assembly includes the separator according to the first aspect of the present application, and the second region is provided at a corner of an innermost circle of the winding-typed electrode assembly.

In some embodiments, the second region is provided at three corners of the innermost circle of the winding-typed electrode assembly.

Figure 4:
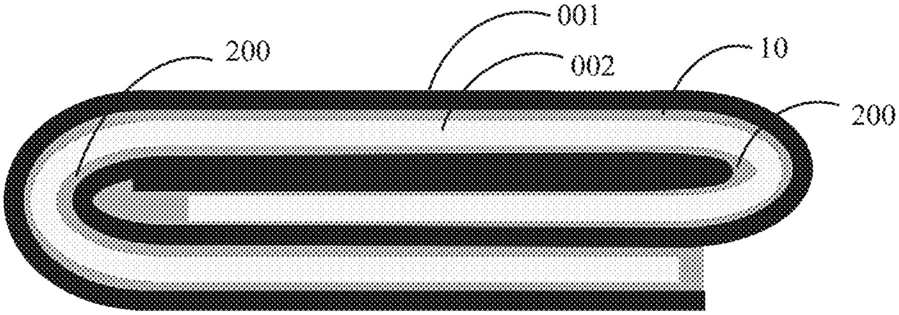
FIG. 4 is a schematic diagram of a winding-typed electrode assembly according to an embodiment of the present application.

As shown in FIG. 4, in the winding-typed electrode assembly, the second region of the separator is provided at the corner of the innermost circle.

In addition, the secondary battery, the battery module, the battery pack and the power consumption apparatus of the present application will be described below with reference to the accompanying drawings as appropriate.

In general, the secondary battery includes a positive electrode sheet, a negative electrode sheet, an electrolyte and a separator. During the charging and discharging process of the battery, an active ion is inserted and extracted back and forth between the positive electrode sheet and the negative electrode sheet. The electrolyte plays the role of conducting the ion between the positive electrode sheet and the negative electrode sheet. The separator is provided between the positive electrode sheet and the negative electrode sheet, and mainly plays the role of preventing a short circuit of the positive electrode sheet and the negative electrode sheet, and at the same time, it may allow the ion to pass through.

[Positive Electrode Sheet]

A positive electrode sheet includes a positive electrode current collector and a positive film layer provided on at least one surface of the positive electrode current collector, and the positive film layer includes a positive active material.

As an example, the positive electrode current collector has two opposite surfaces in its thickness direction, and the positive electrode film layer is provided on either or both of the two opposite surfaces of the positive electrode current collector.

In some embodiments, the positive electrode current collector may use a metal foil or a composite current collector. For example, as the metal foil, an aluminum foil may be used. The composite current collector may include a polymer material base layer and a metal layer formed on at least one surface of the polymer material base layer. The composite current collector may be formed by forming a metal material (aluminum, aluminum alloy, nickel, nickel alloy, titanium, titanium alloy, silver, silver alloy, or the like) on a polymer material substrate (such as a substrate of polypropylene (PP), polyethylene terephthalate (PET), polybutylene terephthalate (PBT), polystyrene (PS), polyethylene (PE), or the like).

In some embodiments, the positive active material may use a positive active material for batteries known in the art. As an example, the positive active material may include at least one of the following materials: an olivine-structured lithium-containing phosphate, a lithium transition metal oxide, and their respective modified compounds. However, the present application is not limited to these materials, and other conventional materials that may be used as the positive active material for the battery may further be used. One type of these positive active materials may be used alone, or two or more types thereof may be used in combination. Where examples of the lithium transition metal oxide may include, but are not limited to, at least one of lithium cobalt oxides (such as $LiCoO_2$), lithium nickel oxides (such as $LiNiO_2$), lithium manganese oxides (such as $LiMnO_2$, $LiMn_2O_4$), lithium nickel cobalt oxides, lithium manganese cobalt oxides, lithium nickel manganese oxides, lithium nickel cobalt manganese oxides (such as $LiNi_{1/3}Co_{1/3}Mn_{1/3}O_2$ ($NCM_{333}$ for short), $LiNi_{0.5}Co_{0.25}Mn_{0.25}O_2$ ($NCM_{523}$ for short), $LiNi_{0.6}Co_{0.2}Mn_{0.2}O_2$ ($NCM_{211}$ for short), $LiNi_{0.6}Co_{0.2}Mn_{0.2}O_2$ ($NCM_{622}$ for short)), $LiNi_{0.8}Co_{0.1}Mn_{0.1}O_2$ ($NCM_{811}$ for short)), lithium nickel cobalt aluminum oxides (such as $LiNi_{0.85}Co_{0.15}Al_{0.05}O_2$) and their modified compounds, or the like. Examples of the olivine-structured lithium-containing phosphate may include, but are not limited to, at least one of lithium iron phosphate (such as $LiFePO_4$ (LFP for short)), a composite of lithium iron phosphate and carbon, lithium manganese phosphate (such as $LiMnPO_4$), a composite of lithium manganese phosphate and carbon, lithium manganese iron phosphate, and a composite of lithium manganese iron phosphate and carbon.

In some embodiments, the positive film layer further optionally includes a binder. As an example, the binder may include at least one of polyvinylidene fluoride (PVDF), polytetrafluoroethylene (PTFE), vinylidene fluoride-tetrafluoroethylene-propylene terpolymer, vinylidene fluoride-hexafluoropropylene-tetrafluoroethylene terpolymer, tetrafluoroethylene-hexafluoropropylene copolymer and fluoro containing acrylate resin.

In some embodiments, the positive film layer further optionally includes a conductive agent. As an example, the conductive agent may include at least one of superconducting carbon, acetylene black, carbon black, Ketjen black, carbon dots, carbon nanotubes, graphene, and carbon nanofibers.

In some embodiments, the positive electrode sheet may be prepared by the flowing methods: the above components used to prepare the positive electrode sheet, such as the positive active material, the conductive agent, the binder and any other components are dispersed in a solvent (such as N-methylpyrrolidone) to form a positive electrode slurry; and the positive electrode slurry is coated on the positive electrode current collector, and after drying, cold pressing and other processes, the positive electrode sheet may be obtained.

[Negative Electrode Sheet]

A negative electrode sheet includes a negative electrode current collector and a negative electrode film layer provided on at least one surface of the negative electrode current collector, and the negative electrode film layer includes a negative active material.

As an example, the negative electrode current collector has two opposite surfaces in its thickness direction, and the negative electrode film layer is provided on either or both of the two opposite surfaces of the negative electrode current collector.

In some embodiments, the negative electrode current collector may use a metal foil or a composite current collector. For example, as the metal foil, a copper foil may be used. The composite current collector may include a polymer material base layer and a metal layer formed on at least one surface of the polymer material base layer. The composite current collector may be formed by forming a metal material (copper, copper alloy, nickel, nickel alloy, titanium, titanium alloy, silver and silver alloy, etc.) on a polymer material substrate (such as a substrate of polypropylene (PP), polyethylene terephthalate (PET), polybutylene terephthalate (PBT), polystyrene (PS), polyethylene (PE), or the like).

In some embodiments, the negative active material may use a negative active material for batteries known in the art. As an example, the negative active material may include at least one of the following materials: artificial graphite, natural graphite, soft carbon, hard carbon, silicon-based material, tin-based material, lithium titanate, and the like. The silicon-based material may be selected from at least one of elemental silicon, silicon-oxygen compounds, silicon-carbon composites, silicon-nitrogen composites, and silicon alloys. The tin-based material may be selected from at least one of elemental tin, tin oxide compounds and tin alloys. However, the present application is not limited to these materials, and other conventional materials that may be used as the negative active material for the battery may further be used. One type of these negative active materials may be used alone, or two or more types may be used in combination.

In some embodiments, the negative electrode film layer further optionally includes a binder. The binder may be selected from at least one of styrene-butadiene rubber (SBR), polyacrylic acid (PAA), polyacrylate sodium (PAAS), polyacrylamide (PAM), polyvinyl alcohol (PVA), sodium alginate (SA), polymethacrylic acid (PMAA), and carboxymethyl chitosan (CMCS).

In some embodiments, the negative electrode film layer further optionally includes a conductive agent. The conductive agent may be selected from at least one of superconducting carbon, acetylene black, carbon black, Ketjen black, carbon dots, carbon nanotubes, graphene, and carbon nanofibers.

In some embodiments, the negative film layer may further optionally include other adjuvants, for example, thickening agents (such as sodium carboxymethyl cellulose (CMC-Na)), or the like.

In some embodiments, the negative electrode sheet may be prepared by the following manner: the above components used to prepare the negative electrode sheet, such as the negative active material, the conductive agent, the binder and any other components are dispersed in a solvent (such as deionized water) to form a negative electrode slurry; and the negative electrode slurry is coated on the negative electrode current collector, and after drying, cold pressing and other processes, the negative electrode sheet may be obtained.

[Electrolyte]

An electrolyte plays the role of conducting an ion between a positive electrode sheet and a negative electrode sheet. The present application has no special restriction on the types of the electrolyte, and it may be selected according to needs. For example, the electrolyte may be liquid.

In some embodiments, the electrolyte uses an electrolytic solution. The electrolytic solution includes an electrolyte salt and a solvent.

In some embodiments, the electrolyte salt may be selected from at least one of lithium hexafluorophosphate, lithium tetrafluorborate, lithium perchlorate, lithium hexafluorarate, lithium difluorimide, lithium trifluoromethosulfonimide, lithium trifluoromethosulfonimide, lithium difluorophosphate, lithium difluoroxalate borate, lithium dioxalate borate, lithium difluoroxalate phosphate and lithium tetrafluoroxalate phosphate.

In some embodiments, the solvent may be selected from at least one of ethylene carbonate, propylene carbonate, ethyl methyl carbonate, diethyl carbonate, dimethyl carbonate, dipropyl carbonate, carbonic acid methyl propyl, ethyl propyl carbonate, butylene carbonate, fluoroethylene carbonate, methyl formate, methyl acetate, ethyl acetate, propyl acetate, methyl propionate, ethyl propionate, propionate, methyl butyrate, ethyl butyrate, 1, 4-butyrolactone, sulfolane, dimethyl sulfone, methyl ethyl sulfone and diethyl sulfone.

In some embodiments, the electrolyte may further optionally include an additive. For example, the additive may include a negative electrode film forming additive, a positive electrode film forming additive, and may further include an additive that may improve some performance of the battery, such as an additive that improves overcharge performance of the battery, an additive that improves high or low temperature performance of the battery, and the like.

In some embodiments, the positive electrode sheet, the negative electrode sheet and the separator may be subject to a winding process to obtain an electrode assembly.

In some embodiments, a secondary battery may include an outer package. The outer package may be used to package the above electrode assembly and electrolyte.

In some embodiments, the outer package of the secondary battery may be a hard shell such as a hard plastic shell, an aluminum shell, or a steel shell. The outer package of the secondary battery may be a soft package, such as a bag-type soft package. A material of the soft package may be plastic, for example, polypropylene, polybutylene terephthalate, and polybutylene succinate may be listed.

Figure 5:
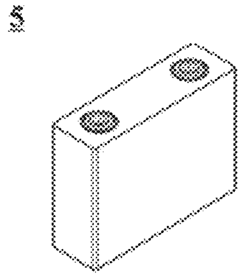
FIG. 5 is a schematic diagram of a secondary battery according to an embodiment of the present application.

The shape of the secondary battery is not particularly limited in the present application, and may be cylindrical, square, or any other shapes. For example, FIG. 5 shows a secondary battery 5 of a square structure as an example.

Figure 6:
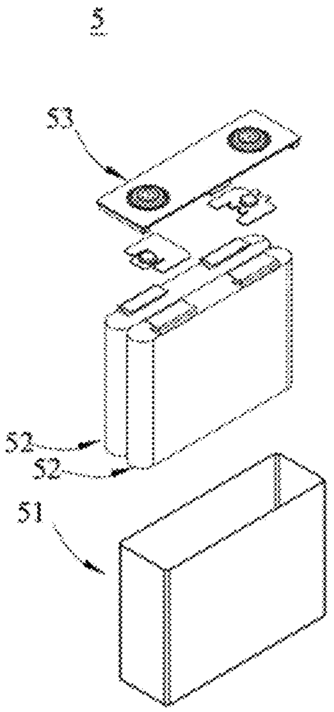
FIG. 6 is an exploded view of the secondary battery according to an embodiment of the present application shown in FIG. 5.

In some embodiments, referring to FIG. 6, the outer package may include a housing 51 and a cover plate 53. The housing 51 may include a bottom plate and a side plate connected to the bottom plate. The bottom plate and the side plate are enclosed to form an accommodating cavity. The housing 51 has an opening communicating with the accommodating cavity, and the cover plate 53 may cover the opening to close the accommodating cavity. A positive electrode sheet, a negative electrode sheet, and a separator may be subject to a winding process or a lamination process to form an electrode assembly 52. The electrode assembly 52 is packaged in the accommodating cavity. The electrolytic solution is infiltrated in the electrode assembly 52. The number of electrode assemblies 52 included in the secondary battery 5 may be one or more, and the specific number may be selected by those skilled in the art according to specific actual needs.

In some embodiments, secondary batteries may be assembled into a battery module, and the number of secondary batteries included in the battery module may include one or more, and the specific number may be selected by those skilled in the art according to application and capacity of the battery module.

Figure 7:
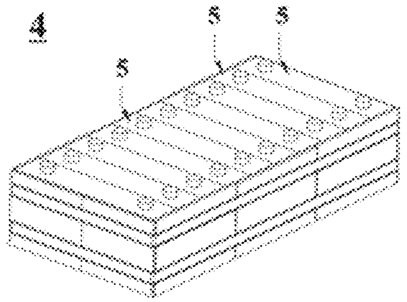
FIG. 7 is a schematic diagram of a battery module according to an embodiment of the present application.

FIG. 7 shows a battery module 4 as an example. Referring to FIG. 7, in the battery module 4, a plurality of secondary batteries 5 may be sequentially arranged along a length direction of the battery module 4. Certainly, they may be arranged in accordance with any other manner. Further, the plurality of secondary batteries 5 may be fixed by using fasteners.

Optionally, the battery module 4 may further include a shell with an accommodating space, and the plurality of secondary batteries 5 are accommodated in the accommodating space.

In some embodiments, the above battery modules may be further assembled into a battery pack, and the number of battery modules included in the battery pack may be one or more, and the specific number may be selected by those skilled in the art according to application and capacity of the battery pack.

Figure 8:
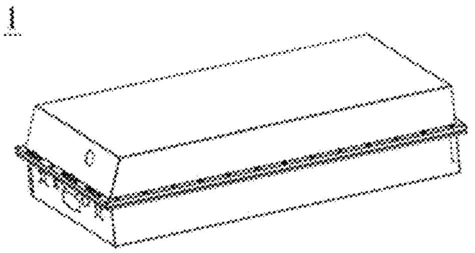
FIG. 8 is a schematic diagram of a battery pack according to an embodiment of the present application.
Figure 9:
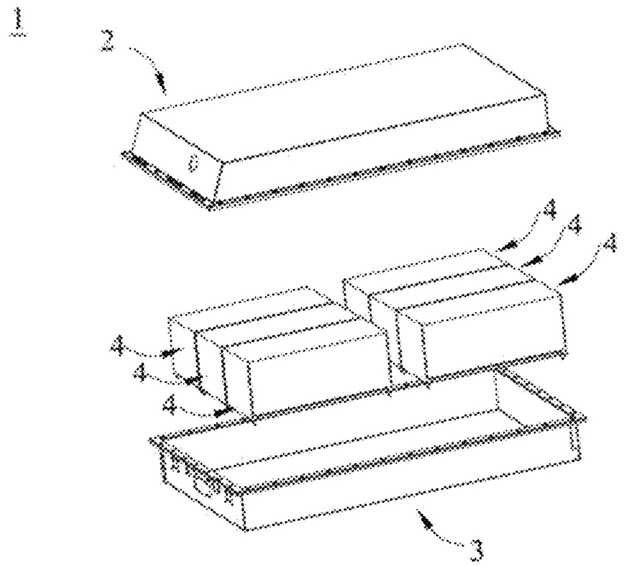
FIG. 9 is an exploded view of the battery pack according to an embodiment of the present application shown in FIG. 8.

FIG. 8 and FIG. 9 show a battery pack 1 as an example. Referring to FIG. 8 and FIG. 9, the battery pack 1 may include a battery box and a plurality of battery modules 4 disposed in the battery box. The battery box includes an upper box 2 and a lower box 3. The upper box 2 may cover the lower box 3 and form an enclosed space for accommodating the battery modules 4. The plurality of battery modules 4 may be arranged in the battery box in any manner.

In addition, the present application further provides a power consumption apparatus, the power consumption apparatus including at least one of the secondary battery, the battery module, or the battery pack provided in the present application. The secondary battery, the battery module, or the battery pack may be used as a power source of the power consumption apparatus or may be used as an energy storage unit of the power consumption apparatus. The power consumption apparatus may include a mobile device (for example, a mobile phone, a notebook computer, and the like), an electric vehicle (for example, a pure electric vehicle, a hybrid electric vehicle, a plug-in hybrid electric vehicle, an electric bicycle, an electric scooter, an electric golf cart, an electric truck, and the like), an electric train, a ship and a satellite, an energy storage system, or the like, but is not limited to this.

As the power consumption apparatus, a secondary battery, a battery module, or a battery pack may be selected according to usage requirements.

Figure 10:
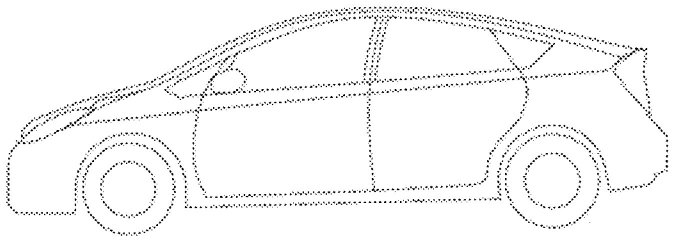
FIG. 10 is a schematic diagram of a power consumption apparatus in which a secondary battery is used as a power source according to an embodiment of the present application.

FIG. 10 shows a power consumption apparatus as an example. The power consumption apparatus is a pure electric vehicle, a hybrid electric vehicle, a plug-in hybrid electric vehicle, or the like. To meet a requirement of the power consumption apparatus for high power and high energy density of a secondary battery, a battery pack or a battery module may be used.

The power consumption apparatus as another example may be a mobile phone, a tablet computer, a notebook computer, or the like. The power consumption apparatus usually requires lightness and thinness, and a secondary battery may be used as a power source.

EMBODIMENT

Hereinafter, embodiments of the present application will be described. The embodiments described below are illustrative, only used to explain the present application, and should not be construed as a limitation to the present application. Where specific techniques or conditions are not specified in the embodiments, they are performed according to techniques or conditions described in the literature in the art or according to product specifications. The reagents or instruments used without specifying the manufacturer are conventional products that may be obtained from the market.

Embodiment 1

[Preparation of Separator]

(1) A polyethylene substrate is provided, and a thickness of the substrate is 7 μm and a porosity is 39%;

(2) At room temperature where a relative humidity is less than 2%, a boehmite particle and a first polymer polyvinylidene fluoride (PVDF) (with a molecular weight of 500,000) are slowly added to a N-methylpyrrolidone (NMP) solution in a weight ratio of 4:1, and are stirred at a speed of 800 rpm at 25° C. for more than 2 hours to form a uniform and stable first slurry with a solid content of 20% (by weight), where a particle size distribution of the boehmite particle is 0.05 μm-0.2 μm;

(3) At room temperature where the relative humidity of less than 2%, a second polymer PVDF (with a molecular weight of 500,000) is slowly added into the NMP solution, and is stirred at a speed of 800 rpm at 25° C. for more than 5 hours to form a uniform and stable second slurry with a solid content of 20% (by weight);

(4) The first slurry is applied on one surface of the substrate by extrusion coating, and is dried at 100° C. for 10 minutes, where a weight per unit area of a single-sided coating on a separator is 9.6 g/m$^2$;

(5) Three positions on the surface of the separator are made indentations, the second slurry is applied to the indentations, and is dried at 110° C. for 10 minutes, and is rolled and shaped to make the surface of the separator flat and smooth, and is cut to obtain the separator including three second regions. Where a position and width of the second region is determined by three corners of an innermost circle of a winding-typed electrode assembly to be prepared, and a width thereof is: 10 mm.

[Preparation of Secondary Battery]

1. Preparation of Positive Electrode Sheet

A positive active material $LiNi_{0.5}Co_{0.2}Mn_{0.3}O_2$ ($NCM_{523}$), a conductive agent conductive carbon black and a binder PVDF are mixed uniformly in an appropriate amount of solvent NMP according to a weight ratio of 90:7:3 to obtain a positive slurry, and the positive slurry is coated on a positive collector aluminum foil to obtain a positive electrode sheet through drying, cold pressing, slitting and cutting processes. A surface density of the positive electrode sheet is 0.175 mg/mm$^2$.

2. Preparation of Negative Electrode Sheet

A negative active material graphite, a conductive agent conductive carbon black, a thinkener sodium carboxymethyl cellulose (CMC), and a binder styrene butadiene rubber lotion (SBR, with a viscosity of 350) are mixed uniformly in an appropriate amount of deionized water solvent according to a weight ratio of 96.5:1.0:1.0:1.5 to obtain a negative electrode slurry, and the negative electrode slurry is coated on a negative electrode collector copper foil to obtain a negative electrode sheet through drying, cold pressing, slitting, and cutting processes. A surface density of the negative electrode sheet is 0.110 mg/mm$^2$.

3. Preparation of Electrolytic Solution

An electrolytic solution uses a commercial electrolytic solution for a lithium ion battery, where an organic solvent is a mixture of ethyl carbonate, diethyl carbonate and propyl carbonate in a weight ratio of 50:40:10, and a concentration of electrolyte salt lithium hexafluorphosphate is 1 mol/L.

4. Preparation of Secondary Battery

The above positive electrode sheet, separator and negative electrode sheet are stacked in order, and then are wound to obtain an electrode assembly, where a second region of the separator is provided at three corners of the innermost circle of the winding-typed electrode assembly; and the electrode assembly is placed in an outer package, the above prepared electrolytic solution is injected into a dried secondary battery to obtain the secondary battery through vacuum packaging, standing, forming and shaping processes.

Embodiment 2

The preparation of a separator and the preparation of a secondary battery refer to Embodiment 1 overall. The difference is that part of PVDF in a second slurry is replaced with an ethylene-vinyl acetate copolymer microsphere (with a molecular weight of 24,000, and a particle size distribution of 1-10 μm), so that a weight ratio of the ethylene-vinyl acetate copolymer microsphere and the PVDF in the second slurry is 99:1.

Embodiment 3-5

The preparation of a separator and the preparation of a secondary battery refer to Embodiment 1 overall. The difference is that part of PVDF in a second slurry is replaced with an ethylene-vinyl acetate copolymer microsphere (with a molecular weight of 24,000, and a particle size distribution of 1-10 μm), so that weight ratios of the ethylene-vinyl acetate copolymer microsphere and the PVDF in the second slurry are 3:1, 4:1 and 1:1 respectively.

Embodiment 6

The preparation of a separator and the preparation of a secondary battery refer to Embodiment 1 overall. The difference is that part of PVDF in a second slurry is replaced by an acrylonitrile-methyl acrylate copolymer powder (with a molecular weight of 100,000, and a particle size distribution of 0.1-10 μm), so that a weight ratio of the acrylonitrile-methyl acrylate copolymer powder and the PVDF in the second slurry is 99:1.

Embodiment 7

The preparation of a separator and the preparation of a secondary battery refer to Embodiment 1 overall. The difference is that part of PVDF in a second slurry is replaced by a mixture of acrylonitrile-methyl acrylate copolymer (with a molecular weight of 50,000, and a particle size distribution of 0.1-10 μm) and sodium carboxymethyl cellulose (with a molecular weight distribution of 50-250,000) in a weight ratio of 1:1, so that a weight ratio of the mixture of the acrylonitrile-methyl acrylate copolymer and the sodium carboxymethyl cellulose and the PVDF in the second slurry is 99:1.

Embodiment 8

The preparation of a separator and the preparation of a secondary battery refer to Embodiment 1 overall. The difference is that a first region and a second region are made on both surfaces of a separator substrate.

Embodiment 9

The preparation of a separator and the preparation of a secondary battery refer to Embodiment 1 overall. The difference is that the separator only includes a second region with a width of 10 mm, and in the preparation of the secondary battery, the second region of the separator is provided at a corner of an innermost circle of an electrode assembly.

Comparative Example 1

The preparation of a separator and the preparation of a secondary battery refer to Embodiment 1 overall. The difference is that in the preparation of the separator, only one surface of a substrate is coated with a first slurry.

Secondary Battery Cycling Test

A battery is charged and discharged at 25° C., that is, it is charged to 4.2V at 1/3C current, then it is discharged to 2.8V at 1/3C current, and a discharge capacity of a first cycle is recorded; and then the battery is charged and discharged with a current of 1/3C/1/3C for cycling 1000 cycles, and a discharge capacity of the battery of an 1000th cycle is recorded, and a capacity retention rate of the 1000th cycle is obtained by dividing the discharge capacity of the 1000th cycle by the discharge capacity of the first cycle.

According to the above processes, the secondary batteries obtained in the above embodiments and comparative example are test respectively. See Table 1 for specific values.

TABLE 1

| | Coating | | | | Battery performance Capacity |
|---|---|---|---|---|---|
| Embodiment | Second polymer | Weight content of the second polymer | Coating position | Position of a second region | retention rate of 1000 cycles (%) |
| Embodiment 1 | PVDF | 100% | Single side | Three corners of an innermost circle | 87.4 |
| Embodiment 2 | Ethylene-vinyl acetate copolymer | 99% | Single side | Three corners of an innermost circle | 88.7 |
| Embodiment 3 | Ethylene-vinyl acetate copolymer | 75% | Single side | Three corners of an innermost circle | 90.6 |
| Embodiment 4 | Ethylene-vinyl acetate copolymer | 80% | Single side | Three corners of an innermost circle | 89.5 |
| Embodiment 5 | Ethylene-vinyl acetate copolymer | 50% | Single side | Three corners of an innermost circle | 88.7 |
| Embodiment 6 | Acrylonitrile-methyl acrylate copolymer | 99% | Single side | Three corners of an innermost circle | 91.4 |
| Embodiment 7 | Acrylonitrile-methyl acrylate copolymer and sodium carboxy-methyl cellulose (1:1) | 99% | Single side | Three corners of an innermost circle | 89.3 |
| Embodiment 8 | PVDF | 100% | Double sides | Three corners of an innermost circle | 90.2 |
| Embodiment 9 | PVDF | 100% | Single side | One corner of an innermost circle | 86.1 |
| Comparative example 1 | / | / | Single side | / | 83.4 |

It may be seen from Table 1 that capacity retention rates of 1000 cycles (%) of secondary batteries in all embodiments are higher than that of the secondary battery in the comparative example. In other words, by providing a specific second region in a coating of a separator and providing the second region at a corner of an innermost circle of a winding-typed electrode assembly may significantly improve cycle performance of the secondary battery.

It should be noted that the present application is not limited to the foregoing embodiments. The above embodiments are merely examples, and embodiments having substantially the same configuration as the technical idea and exerting the same effects within the scopes of the technical solutions of the present application are all included in the technical scope of the present application. In addition, without departing from the theme of the present application, application of various modifications that may be conceived by those skilled in the art to the embodiments and other modes constructed by combining some of the constituent elements of the embodiments are further included in the scope of the present application.

What is claimed is:

1. A separator, comprising a porous substrate, and a coating on at least one surface of the porous substrate, the coating comprising a first region and a plurality of discrete second regions on one of the at least one surface of the porous substrate, the first region comprising an inorganic ceramic particle and a first polymer, each of the second regions comprising a second polymer, and the first region having a same thickness as each of the second regions, wherein a weight content of the second polymer in each of the second regions is 20%-100% based on a total weight of the each of the second regions, wherein a width of each of the second regions is in a range of 100 μm-100 mm.

2. The separator according to claim 1, wherein the second polymer is selected from the group consisting of polyvinylidene fluoride, polyvinyl alcohol, polypropylene alcohol, chlorinated rubber, ethylene-vinyl acetate copolymer, polyvinyl acetate, polyvinyl butyrate, polyvinyl chloride, polybutadiene, cyclized rubber, acrylonitrile-methyl acrylate copolymer and sodium carboxymethyl cellulose.

3. The separator according to claim 1, wherein a weight content of the inorganic ceramic particle in the first region is 50%-99%, based on a total weight of the first region.

4. The separator according to claim 1, wherein a weight content of the first polymer in the first region is 1%-50%, based on the total weight of the first region.

5. A secondary battery, comprising a winding-typed electrode assembly, wherein the winding-typed electrode assembly comprises the separator according to claim 1, and the second region is provided at a corner of an innermost circle of the winding-typed electrode assembly.

6. A battery module, comprising the secondary battery according to claim 5.

7. A battery pack, comprising the battery module according to claim 6.

8. A power consumption apparatus, comprising the battery pack according to claim 7.

9. The separator according to claim 1, wherein the weight content of the second polymer in each of the second regions is 50%-100% based on the total weight of the each of second regions.

* * * * *